(12) United States Patent
Murphy et al.

(10) Patent No.: US 9,501,571 B1
(45) Date of Patent: *Nov. 22, 2016

(54) CATEGORY GENERALIZATION FOR SEARCH QUERIES

(71) Applicant: Google Inc., Mountain View, CA (US)

(72) Inventors: Bruce Winston Murphy, Pyrmont (AU); Michael Steven Perrow, Pyrmont (AU); Yifei Lu, Maroubra (AU); Kendra Jay Carattini, Ashfield (AU)

(73) Assignee: Google Inc., Mountain View, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/658,899

(22) Filed: Mar. 16, 2015

Related U.S. Application Data

(63) Continuation of application No. 13/839,953, filed on Mar. 15, 2013, now Pat. No. 8,983,956.

(51) Int. Cl.
    *G06F 17/30* (2006.01)

(52) U.S. Cl.
    CPC ..... *G06F 17/30864* (2013.01); *G06F 17/3053* (2013.01); *G06F 17/30241* (2013.01); *G06F 17/30598* (2013.01)

(58) Field of Classification Search
    USPC ............... 707/708, 731, 736, 763, 771, 803
    See application file for complete search history.

(56) References Cited

U.S. PATENT DOCUMENTS

| | | | |
|---|---|---|---|
| 6,523,021 B1 | 2/2003 | Monberg et al. | |
| 6,792,422 B1 | 9/2004 | Stride et al. | |
| 7,650,431 B2 | 1/2010 | Wang et al. | |
| 8,037,166 B2 | 10/2011 | Seefeld et al. | |
| 2003/0083971 A1* | 5/2003 | Kawamoto | G06Q 40/02 705/36 R |
| 2004/0054691 A1 | 3/2004 | Sharma et al. | |
| 2006/0178932 A1 | 8/2006 | Lang | |
| 2009/0182729 A1 | 7/2009 | Lu et al. | |
| 2009/0248595 A1 | 10/2009 | Lu et al. | |
| 2010/0161663 A1 | 6/2010 | Patman Maguire | |
| 2011/0010367 A1 | 1/2011 | Jockish et al. | |
| 2012/0203778 A1 | 8/2012 | Riley et al. | |
| 2013/0080250 A1* | 3/2013 | Lee | G06Q 30/02 705/14.49 |
| 2013/0326414 A1* | 12/2013 | Zhang | G06Q 10/10 715/835 |

* cited by examiner

*Primary Examiner* — Cam-Linh Nguyen

(74) *Attorney, Agent, or Firm* — Dority & Manning, P.A.

(57) ABSTRACT

A system and computer-implemented method are provided for associating categories with business names for generalizing search queries, the method including identifying one or more businesses within a first geographic region, determining a business name and one or more categories for each of the one or more businesses, generating one or more name components for each of the one or more businesses from the name of the business, generating one or more name component groups from the name components of the one or more businesses, each name component group including one or more identical name components, determining for each name component group, if the one or more name components within the name component group are associated with businesses that share one or more common categories and associating the one or more common categories with the name component of the name component group.

20 Claims, 5 Drawing Sheets

CATEGORY GENERALIZATION FOR SEARCH QUERIES

PRIORITY CLAIM

The present application is a continuation of U.S. application Ser. No. 13/839,953 having a filing date of Mar. 15, 2013. Applicants claim priority to and benefit of all such applications and incorporate all such applications herein by reference.

BACKGROUND

When integrating advertisement and commercial content (generally referred to as "ads") into search results, it may be useful to identify the general categories associated with the search query and provide ads associated with those categories. One approach is to determine the category directly from the results of the search query itself. However, with this approach, the search results must be known before the category can be determined for the purpose of ad integration. Another approach to find related content (e.g., ads) for a query is performed based on expanding the query based on historical search results shown with respect to past searches for the search terms or phrases within the query. This approach generates synonyms for various search terms and/or phrases when these search terms and phrases lead to search results that provide a statistical likeliness that the search term or phrase is synonymous with other term or phrases. This requires a high volume search query, such that previous search results exist for the query and can be analyzed to determine synonyms (e.g., including a category) accurately within an acceptable margin of error. Additionally, because the synonyms are driven from results across a large numbers of users and geographic areas, this approach does not offer geographic granularity (e.g., beyond country). Geographically specific generalization of a business to one or more categories, independent of the volume of past results, is useful in providing a wider array of content (e.g., including ads) to a user in response to a query.

SUMMARY

The disclosed subject matter relates to a computer-implemented method for associating categories with business names for generalizing search queries, the method comprising identifying, using one or more computing devices, one or more businesses within a first geographic region. The method may further comprise determining, using the one or more computing devices, a business name and one or more categories associated with each of the one or more businesses. The method may further comprise generating, using the one or more computing devices, one or more name components for each of the one or more businesses, each name component comprising a subset of the business name of the business. The method may further comprise generating, using the one or more computing devices, one or more name component groups from the name components of the one or more businesses, wherein each name component group comprises one or more identical name components. The method may further comprise determining, using the one or more computing devices, for each name component group, if the one or more name components within the name component group are associated with businesses that share one or more common categories. The method may further comprise associating, using the one or more computing devices, the one or more common categories with the name component of the name component group, when the one or more name components within the name component group share one or more common categories.

The disclosed subject matter also relates to a system for associating categories with business names for generalizing search queries, the system comprising one or more processors and a machine-readable medium comprising instructions stored therein, which when executed by the processors, cause the processors to perform operations comprising identifying a first geographic region, the first geographic region being defined as a defined area including a set of locations. The operations may further comprise identifying one or more businesses having a location of the set of locations. The operations may further comprise determining a business name and one or more categories associated with each of the one or more businesses. The operations may further comprise generating one or more name components based on the business name for each of the one or more businesses, the one or more name components comprising one or more of the business name, proper pre-fixes of the business name and proper post-fixes of the business name. The operations may further comprise associating the one or more categories for each of the one or business with the one or more name components for the business. The operations may further comprise for each name component of each of the one or more businesses determining if a name component group represented by the name component exists, generating a name component group represented by the name component group if the name component group does not exist and adding the name component to the name component group represented by the name component.

The disclosed subject matter also relates to a machine-readable medium comprising instructions stored therein, which when executed by a machine, cause the machine to perform operations comprising determining a business name and one or more categories associated with each of one or more businesses. The operations may further comprise generating one or more name components based on the business name for each of the one or more businesses, each name component of a business comprising one of the business name or a component of the business name. The operations may further comprise associating the one or more categories for each of the one or businesses with the one or more name components for the business. The operations may further comprise determining if a name component of a business of the one or more businesses is similar to at least another name component of another business of the one or more businesses. The operations may further comprise mapping the one or more categories of the name component of the one or more name components that is not similar to at least another name component of the one or more name components with the one or more categories associated with the name component. The operations may further comprise determining if the name component and one or more other components of the one or more name components that are similar to the name component share one or more common categories, if a name component of the one or more name components is similar to at least another name component of the one or more name components and mapping the name component to the one or more common categories if the name component and one or more other components of the one or more name components that are similar to the name component share one or more common categories.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
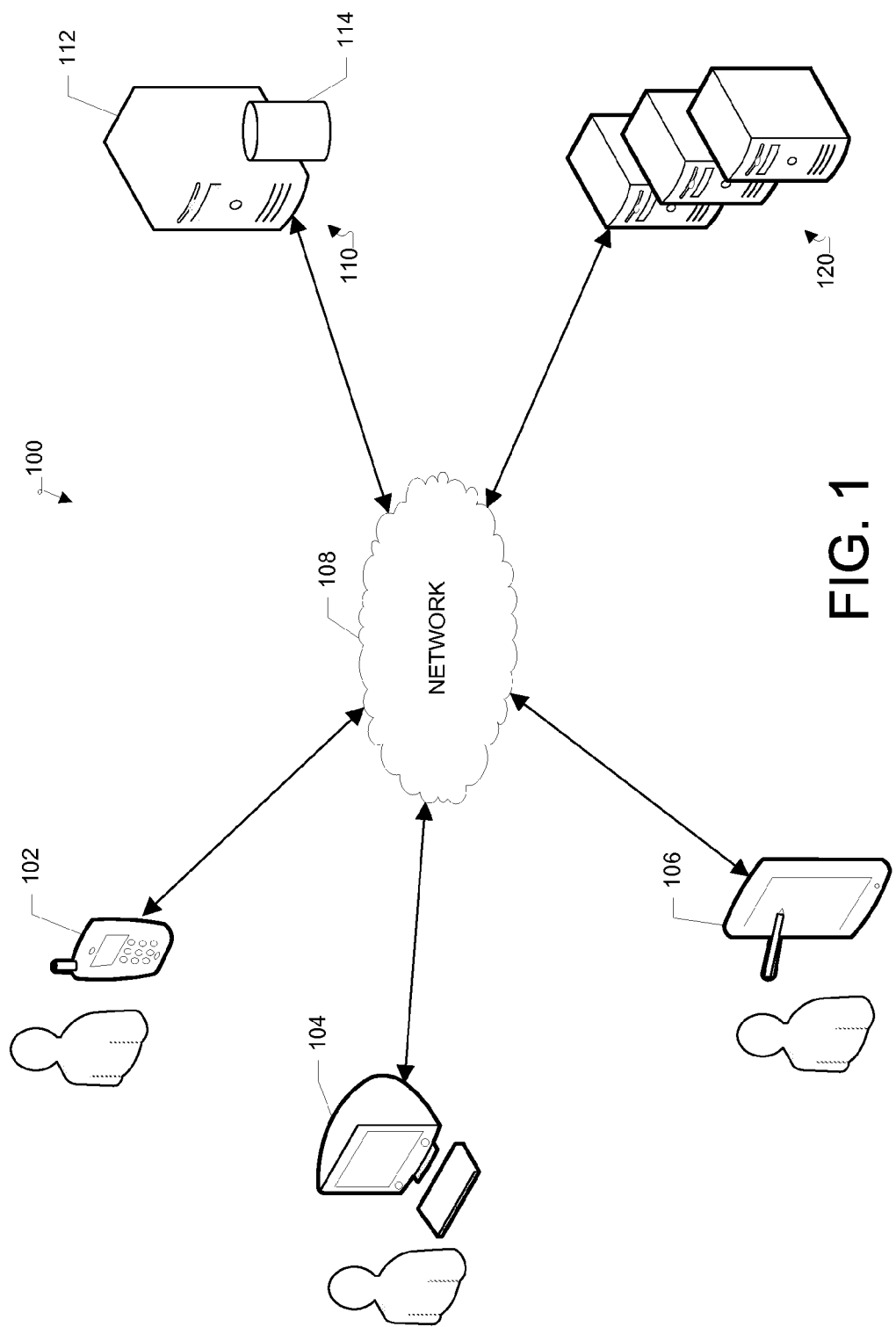
FIG. 1 illustrates an example client-server network environment which provides for facilitating a geographically specific mapping of businesses and business categories for expanding search queries.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a system and method for automatically mapping a business to one or more categories, such that a query including the business name, or parts thereof, as a search term or phrase would be expanded to include the one or more categories. The mapping provides categories as synonyms for a business name, which can be attached to search queries (e.g., for search results including ads) to expand the query, such that searches for one business can be generalized to other businesses in the same business category. For example, when serving ads and/or search results to a user in response to a user query, such search expansion facilitates retrieving content that is closely related to the search query without being limited to the results (e.g., content or ads) that meet the user provided search term or phrases (e.g., a specific business name).

A mapping of business names (e.g., business names, proper names) or components of the business name to particular categories is generated based on analyzing businesses within a specific geographic region. An index is generated for the geographic region, including the mapping of each business name or name component (e.g., a part of the business name) with one or more categories. The mappings are defined for specific geographic regions, but may extend beyond a geographic specific mapping where a business is globally associated with one or more categories (e.g., the mapping exists with respect to more than one geographic region).

To generate the mapping, for each geographic region (e.g., a city or state) all business names are analyzed and converted to a business name mapped to a category token where possible. Businesses are then associated with the one or more categories mapped to the business name based on the analysis and mapping.

The mapping is geographically specific providing local granularity when expanding search queries. Businesses located within a geographic region are identified. In some implementations, only businesses with high prominence may be selected for analysis and/or mapping. For example, activity (e.g., business or customer activity) with respect to the business may determine if the business is of low prominence such that it should not be included in the process. In some examples, the prominence of a business may be determined in relation to other businesses within the region (e.g., businesses with the same name and/or providing similar products and/services with much higher prominence).

Geographic regions may be defined based on preexisting classifications (e.g., cities, counties, etc.) or based on criteria such as population, number of businesses, and/or other similar factors. A business profile may include information regarding a business. For example, one or more data stores may store information regarding one or more business. This information may include location information. Location information regarding a business may be manually entered (e.g., an address entered by a business owner or other user) or may be determined based on unstructured data such as customer check-ins, location of customers, location of nearby business, and/or other information providing an indication of business location.

The information may further include a business name and/or one or more categories associated with the business. Business categories refer to the type of business defined, for example, by the type of products or services offered by the business. In one example, business owners or other users associated with a business may provide category information regarding the business. In other examples, business category information may be determined based on information such as the products and services provided by a business, customer feedback and reviews regarding the business or other data that provides an indication of business category.

The business information including the business location, business name and business category information is used to generate a geographical mapping of business name, or name component, to one or more categories to facilitate generalization of search queries relating to the business. The mapping process includes a name resolution stage where businesses with unique names, or name components that map to one or more categories without ambiguity are identified. "Name components," as used herein, may refer to a subset of a business name, including the business name and/or a part of the business name such as a proper pre-fix or post-fix.

Businesses having similar names or name components are grouped together and the one or more categories associated with each of the businesses are identified. A category resolution stage identifies the common categories for businesses having the same name or name component. If a business name or name component maps to at least one common category, a mapping is generated from the business name or name component to the at least one common category. The result is a mapping from prominent business names, or components thereof, to one or more categories associated with the business.

During the name resolution stage, for each business, the business name is broken down into name components. In one example, name components are generated from proper pre-fix and/or suffixes of a business name. For example, a business named Joe's First Plumbing, may be broken down into three name components, Joe's, Joe's First, and Joe's First Plumbing. In another example, the name component First Plumbing may also be added. In some implementations, the one or more categories associated with the business are attached to the name components of the business. In another example, the one or more categories are associated only with the full business name, and/or certain name components.

In some implementations, each name component is treated as a separate business name for the purpose of category resolution and mapping. Once the name components have been generated and categories have been associated with one or more name components, the system performs a name resolution. The name components are compared to determine if a name component of a business is similar (e.g., identical when taking into account normalization) to a name component of one or more other businesses. In one example, if a name component is determined to be unique, a mapping is generated from the name component to the one or more categories associated with the business and/or name component. For non-unique name components, similar name components are grouped together, and categories associated with each name component in the group are identified.

During the category resolution stage, categories for each name component of the group are compared to categories for other name components in the group to determine if the name components within the group have at least one category in common. In some embodiments, the categories associated with businesses are organized in a hierarchical tree. For example, a hierarchical anthology of categories may be available, arranging categories (e.g., within a region, or a set of regions and/or overall) into a tree of increasingly specialized categories. In such instance, more specific categories may be children to a more general category. For example, a first category, restaurants, may be a root node of the three having a number of children, including for example, Chinese restaurants and Indian restaurants. One or more of the children (e.g., Chinese restaurants) may further have child nodes (e.g., Szechuan food, or Cantonese food). For a name group, categories may be generalized by following child node categories associated with name components within a name component group up the tree to determine if a more general category is common between name components in the group.

In one example, the grouping may be performed for all name components, regardless of whether or not they are unique, and during the category resolution stage any name component groups with only one name component is determined to have the one or more categories of that name component as common categories for the purpose of mapping.

When it is determined that the name components in a name component group resolve to at least one common category, the category is associated with the name component represented by the group. Otherwise, the name component is discarded as a vague name component, because the same (or similar) name component is associated with more than one category, and thus, a mapping of the name component would be ambiguous. In some implementations, when a majority or a pre-defined number of name components within the group share one or more common categories and/or the name components that mismatch have a very low prominence, the mapping from the name component to the common categories may be created despite the mismatch. In this manner, the category overlap is ignored for low prominence or insignificant businesses.

In some implementations, further optimizations may be performed with respect to the mapping. For example, where the common category is a general category (e.g., in result of generalizations to provide a common category) to the extent that the category as a synonym is unlikely to return a useful set of relevant content, the mapping may be discarded. Additionally, mappings where the name or name component includes the category to which it is mapped may also be discarded (e.g., a mapping for Ted's pizza to pizza). In some implementations, highly geographic mappings are also discarded. Highly geographic mappings refer to a mapping of a well known geographic location or a landmark (e.g., New York) to a defined category. In some examples, a mapping is determined to be highly geographic only if the geographic term causes ambiguity within the specific region. That is, whether a name or component thereof is highly geographic, may be dependent on the region in which the mapping is generated. For example, a mapping of New York Pizza in a geographical region that is distinct from New York may not be discarded. In another example, names that includes other terms or phrases in addition to a geographic identifier may not be discarded (e.g., Ted's on Broadway).

II. Example Client-Server Network Environments for Facilitating Category Generalization for Search Query Expansion FIG. 1 illustrates an example client-server network environment which provides for facilitating a geographically specific mapping of businesses and business categories for expanding search queries. A network environment 100 includes a number of electronic devices 102, 104 and 106 communicably connected to a server 110 by a network 108. One or more remote servers 120 are further coupled to the server 110 and/or the one or more electronic devices 102, 104 and 106. Server 110 includes a processing device 112 and a data store 114. Processing device 112 executes computer instructions stored in data store 114, for example, to generate mappings between a business name, or a component thereof, and one or more categories, in order to provide expanded search results to users at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In one example, the electronic devices 102, 104 and 106 store a User agent such as a browser or application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108. In one example, the server 110 may host the system for generating and providing business name to category mappings.

Each of the one or more remote servers 120 can be a single computing device such as a computer server or can represent more than one computing device working together to perform the actions of a server computer (e.g., cloud computing). Each of the one or more remote servers 120 may host one or more databases maintaining business information for one or more businesses, search engines, content providers, etc. In one embodiment server 110 and one or more remote servers 120 may be implemented as a single server hosting the system and one or more data stores and/or services for providing business information and storing mappings of categories to business names, search engines and/or content providers. In one example, the server 110 and one or more remote servers 120 may communicate through via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
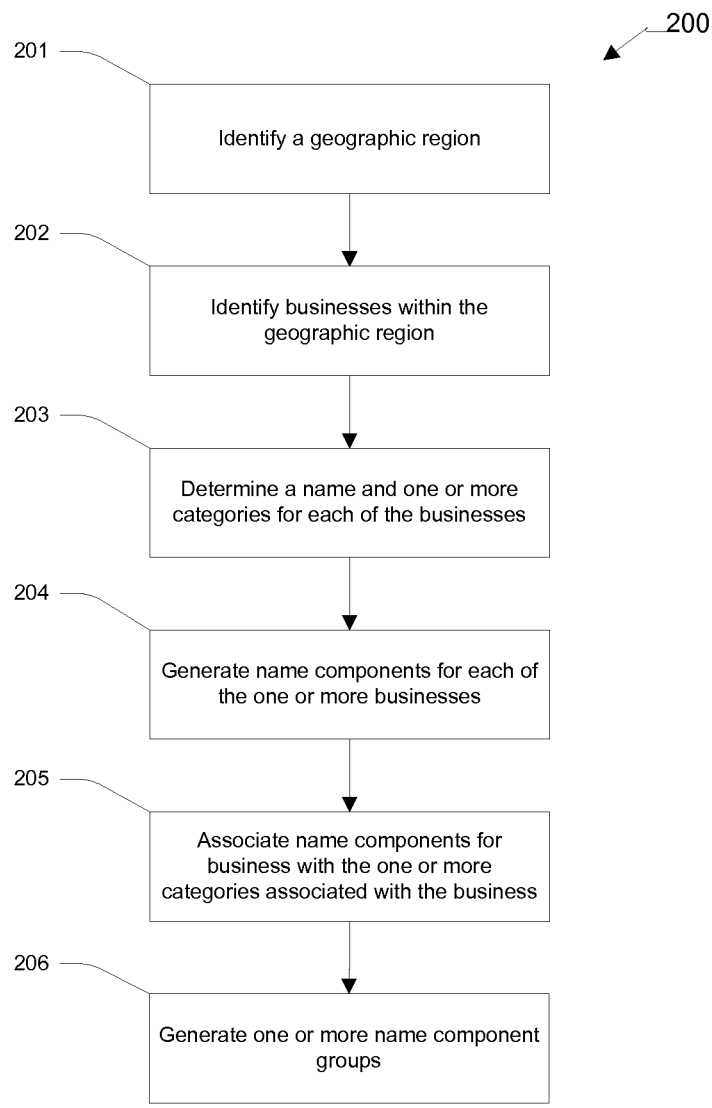
FIG. 2 illustrates an example process for performing name resolution for generating business name to category mappings.

III. Example Processes for Facilitating Category Generalization for Search Query Expansion FIG. 2 illustrates an example process 200 for performing name resolution for generating business name to category mappings. In block 201, the system identifies a geographic region. The geographic region may comprise a city or state, or other predefined geographical territory, and/or may be defined according to other criteria such as population, size and/or number of businesses. The geographic region may be defined using coordinates or other geographic indicia.

In block 202, the system identifies a plurality of businesses within the geographic region. In one example, a business location may be determined from structured data regarding the business (e.g., an address or coordinates of the business). In another example, the business location may be determined based on unstructured data providing indications of business location (e.g., user check-ins, location of nearby businesses, etc.). Businesses having a location within the geographic region are identified.

In block 203, a business name and/or one or more categories associated with each of the businesses is identified. The business name and/or category may be manually entered by a user or may be defined based on other information regarding the business. In one example, information regarding the business may be stored in one or more data stores accessible by the system.

In block 204, the system generates one or more name components for each business. Name components may include the business name itself, as well as proper pre-fix and/or post-fixes of the business name. In one example, during this stage a normalization process is performed to avoid the different forms of a certain common substrings or abbreviations. The result of block 204 is a set of name components, that covers the possible terms or phrases that can be entered by a user when searching for a business. In some implementations, at this stage, a comparison is performed to discard all ambiguous terms. That is, for all name components that match another name component of another business, it is determined that the term is ambiguous and thus the name component is discarded. In such instances, block 205 may not be performed. Instead, any name component that matches a business name of another business is discarded. However, this approach may not account for the possibility of two businesses having similar terms in their names which resolve to a common category.

In some implementations, the one or more categories associated with the original business name from which each name component is generated, to each of those name components, in block 205. This helps identify if similar name components have a common category, before discarding name components that are similar to name components of another business.

In block 206, one or more name component groups are generated. The name components generated in block 204 are compared, and identical name components are grouped together. Since all identical name components (e.g., after normalization) are grouped together, each generated name component group refers to a single term or phrase, name component, represented by the name components within the group. In one example, for each name component, the system determines if a group is already generated including similar name components. If not, a name component group is generated and the name component is added to the name component group, until all name components of the one or more businesses are added to a group. In this manner, one or more name component groups are generated, each including at least one name component.

Figure 3:
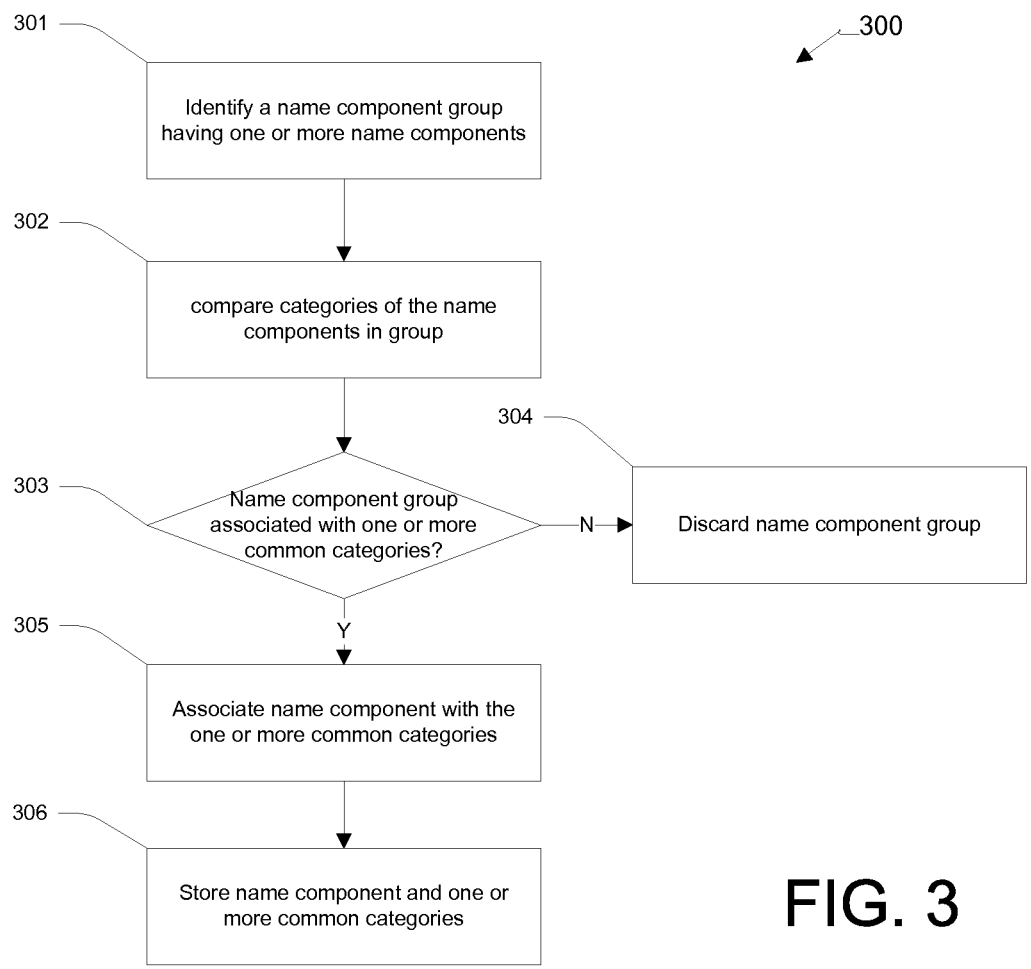
FIG. 3 illustrates an example process for facilitating category resolution for a name component group to generate business name to category mappings.

Once name component groups are generated, the name components within the group can be compared to determine if they share one or more common categories. Since each group of similar name components refers to a search term or phrase that may be entered by a user, it is determined if the name component group maps to one or more categories without creating ambiguity. FIG. 3, described in detail below, provides a detailed description of the process for performing category resolution to generate business name to category mappings for the one or more name component groups generated in block 206.

In one example, for unique name components that are not similar to any other components, a mapping to the one or more categories associated with the name component is generated. Each name component is added to a group, where each group consists of one or more name components and during the category resolution stage, those groups with only one name component are concluded to have the one or more categories of the one name component as common categories.

FIG. 3 illustrates an example process 300 for facilitating category resolution for a name component group to generate business name to category mappings. In block 301 a name component group is identified. Each name component group may include one or more name components generated from business names of one or more businesses within a geographical region. As described above, in some implementations, each name component within the name component group may be associated with one or more categories (e.g., the one or more categories of the business from which the name component was generated).

In block 302, the one or more categories associated with each of the name components within the group are compared to determine a set of common categories for the name component group. In one example, where the name component group includes at least one name component without at least one category association, the entire name component group may be discarded as ambiguous. Otherwise, the one or more categories for each name component within the group are compared to one another to determine common categories. As described above, in some implementations, categories may be defined in a hierarchical manner. In such instances, categories associated with name components within the group may be followed to more general categories to identify one or more common categories among the name components within the name component group.

In block 303, the system determines if one or more common categories have been identified for the name component group. If it is determined that no common categories have been identified for the name component group, in block 304, the name components within the name component group are discarded as ambiguous.

In some implementations, before discarding ambiguous name component groups (e.g., due to lack of common categories or empty name components without categories), optimizations may be performed with respect to the name component group, to determine if the name component(s) that caused the ambiguity relate to a business that is not prominent. The prominence of a business represented by a name component may be determined in relation to businesses related to the other name components in the group and/or according to a pre-defined set of criteria that indicate business prominence. The name component(s) that caused the ambiguity may be discarded and/or ignored form the purpose of category resolution if they relate to a low prominence business.

If it is determined that the name components in the name component group include at least one common category, and thus, can provide an unambiguous mapping, in block 305, the one or more common categories are associated with the name component representative of the name component group to generate one or more name component to category mappings.

In some implementations, the mapping generated in block 305 may be further optimized. For example, where a mapping is generated from a name component to an overly general category, the mapping may be discarded. That is, in some instances, a category may be general that the expansion of a search query based on the mapping does not provide the user with highly relevant information, and may instead lead to information overload. The determination of whether a category is overly general may be based on a range of criteria including the volume of content relating to a category and/or historical results returned with respect to the category. In some examples, the mapping may not be discarded, and instead, at the time of content retrieval, the search engine and/or the content retrieval application may ignore the highly general category as a search term or phrase.

Additionally, mappings where the name or name component includes the category to which it is mapped may also be discarded (e.g., a mapping for Ted's pizza to pizza). With regards to such mappings, the name component may not provide any additional benefit in terms of expanding the query, since the term or phrase represented by the category is already included in the term or phrase (e.g., name component) it is mapped to, and thus provides a repetitive search or phrase for content retrieval purposes.

In some implementations, highly geographic mappings may be identified and discarded. Highly geographic mappings may refer to a business name or component that would result in a mapping of a geographic location (e.g., New York) to a category. In some implementations, the identification of highly geographic terms may be based upon various criteria, including a listing of geographic terms, an importance weight given to the geographic term, the geographical region in which the mapping is generated, and other similar criteria that is helpful in determining if the mapping of the name component containing a geographical term to a category would cause confusion when the user conducts a search (e.g., whether the term could be used for a geographic region instead of a business in a search).

In block 306, the one or more mappings are stored for later retrieval. The stored mappings may be accessed when a user performs a search query to expand the search query in order to provide a user with a more expansive listing of search results and/or ads. In one example, the mappings provides for generalization from one business to one or more other businesses within same or similar categories.

Figure 4:
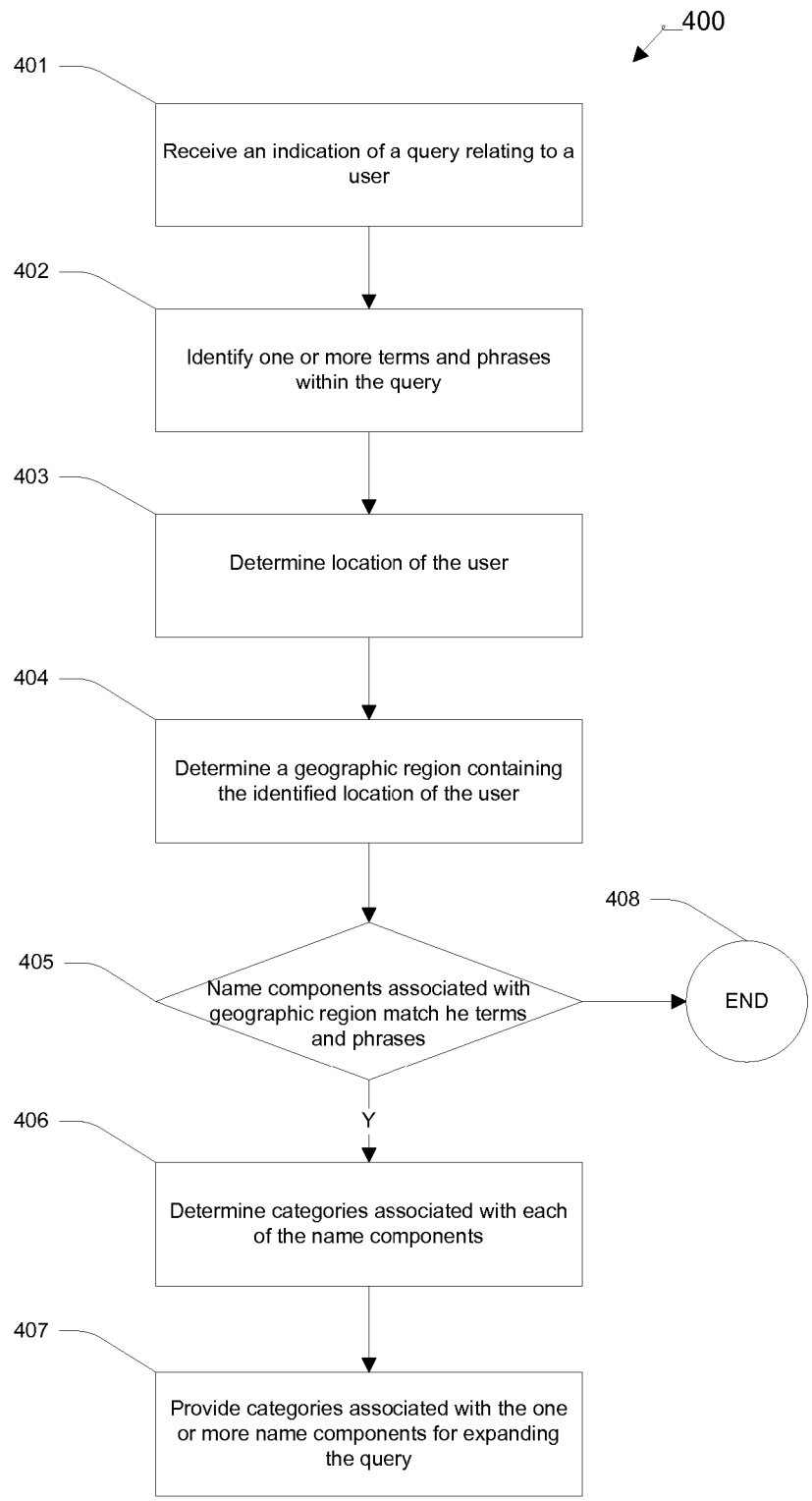
FIG. 4 illustrates an example process for expanding a search query according to business name to category mappings.

FIG. 4 illustrates an example process 400 for expanding a search query according to business name to category mappings. In block 401, an indication of a query relating to a user is received. The indication may be the original search query entered by the user, or may be a request for specific type of content issued by the search engine and/or content retrieval application or service. The query includes the search terms or phrases provided by the user and may further include search terms or phrases identified as synonyms of the search terms or phrases provided by the user. In block 402, the system identifies the one or more search terms and phrases associated with the query identified in block 401.

In block 403, the system determines the location of the user. The location of the user may be determined based on various techniques including querying the user, GPS location mechanisms, the IP address from which the user query is received, or other known techniques for determining a location of a user associated with a search query. The user may also be able to input his or her location. In various embodiments, where the location of the user is determined based on various information the user may be presented with an option to opt in or out of having their location known, determined and/or used by the system.

In block 404, a geographical region containing the location of the user, as determined in block 403, is determined. As described above, geographical regions may be defined according to an array of factors. The system may access a listing of geographic regions (e.g., predefined based on various factors or predefined territories) to determine which region the user location falls within. In other examples, a location may be already mapped to a defined geographic region.

In block 405, the one or more search terms or phrases identified in block 402 are compared to a set of name components relating to businesses within the geographic region. As described above, an index of name components mapped to one or more categories is generated for each geographic region. In block 405, the listing of name component to category mappings for the geographical region is retrieved and the search terms and/or phrases within the query are compared to the name components to determine if one or more of the name components match one or more of the search terms or phrases provided within the query. If no matching name components are identified in block 405, the process ends in block 408.

Otherwise, in block 406 for each identified name component matching a search term or phrase of the query, the one or more categories mapped to the name component are determined. In block 407, the determined one or more categories mapped to the name components matching a search term or phrase in the query are provided as synonyms for the search term or phrase, for expanding the query. The one or more categories serve as additional search terms that may be used to retrieve content in response to the query. In one example, by expanding the search query using categories of businesses included in the search query, the processes described herein facilitates generalizing from a business that offers a particular set of products or services to other businesses that offer the same products and/or services.

IV. Example System for Facilitating Category Generalization for Search Query Expansion Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
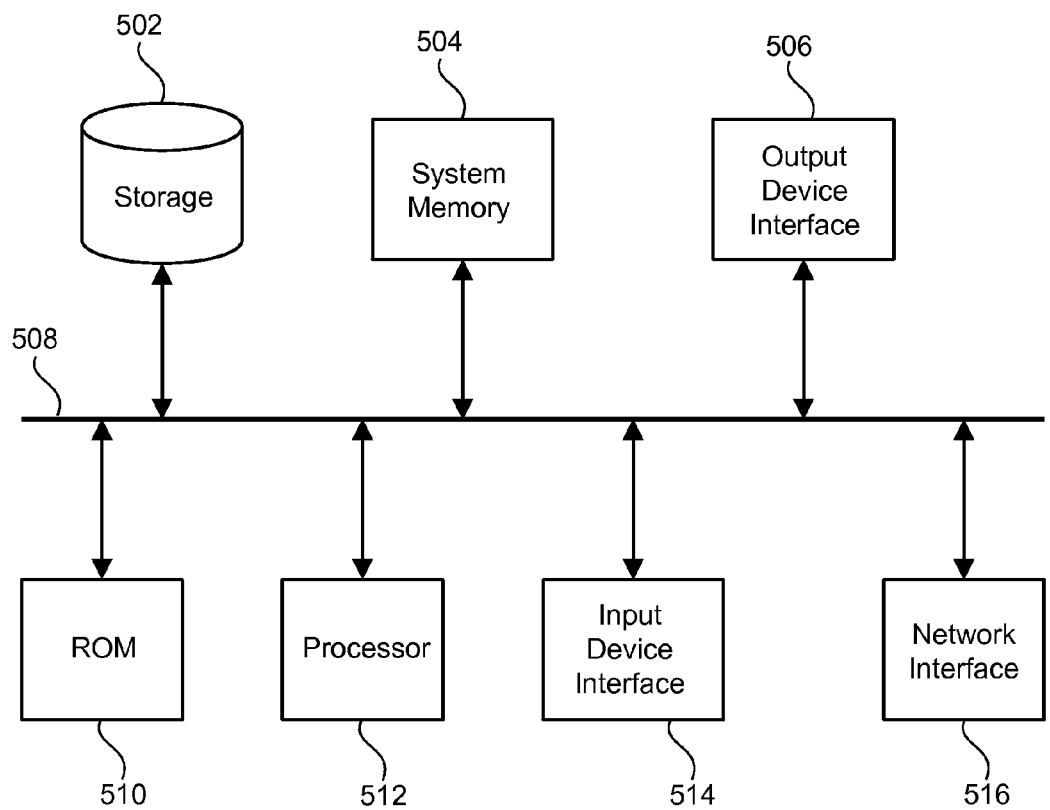
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for facilitating search query expansion through mapping of businesses to one or more categories according to various embodiments. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for associating categories with business names for generalizing search queries, the method comprising:
   receiving, using one or more computing devices, an indication of a search query from a user containing one or more search terms or phrases;
   identifying, using the one or more computing devices, one or more businesses within a first geographic region associated with the user;
   determining, using the one or more computing devices, a business name and one or more categories associated with each of the one or more businesses;
   generating, using the one or more computing devices, one or more name components for each of the one or more businesses, each name component comprising a subset of the business name of the business;
   generating, using the one or more computing devices, one or more name component groups from the name components of the one or more businesses, wherein each name component group comprises one or more identical name components;
   determining, using the one or more computing devices, for each name component group, if the one or more name components within the name component group share one or more common categories;
   associating, using the one or more computing devices, the one or more common categories with the name component of the name component group, when the one or more name components within the name component group share one or more common categories; and
   providing, using the one or more computing devices, the one or more common categories to the user for inclusion within the query.

2. The method of claim 1, further comprising:
   discarding the one or more name components of the name component group if the one or more name components within the name component group do not share one or more common categories.

3. The method of claim 1, wherein generating the one or more name components comprises generating all proper prefixes of the business name.

4. The method of claim 1, wherein generating the one or more name components comprises generating all proper post-fixes of the business name.

5. The method of claim 1, wherein the one or more name components comprises the business name.

6. The method of claim 1, wherein generating the one or more name component groups comprises:
   determining if a name component group represented by the name component exists;
   generating a name component group represented by the name component if the name component group represented by the name component does not exist; and
   adding the name component to the name component group represented by the name component.

7. The method of claim 1, further comprising:
   associating each of one or more name components of a business with the one or more categories associated with the business.

8. The method of claim 1, wherein the determining if all name components within the name component group share one or more common categories comprises:
   determining if a name component group includes more than one name component;
   identifying the one or more categories for the name component as the one or more common categories if the name component group does not include more than one component;
   comparing one or more categories associated with each of the name components to the one or more categories associated with other name components of the name component group if the name component group includes more than one name component.

9. The method of claim 8, the comparing further comprising:
   determining if each name component of the name component group is associated with at least one category;
   determining if all of the one or more components are associated with the same one or more categories if each name component is associated with at least one category;
   identifying the one or more categories as one or more common categories for the name component group if all of the one or more components are associated with the same one or more categories;
   identifying one or more related categories for each of the one or more categories of the one or more name components of the name component group if each name component of the name component group is associated with at least one category;
   determining if all of the one or more components are associated with the same one or more categories if each name component is associated with at least one category; and
   identifying the one or more categories as one or more common categories.

10. The method of claim 8, wherein the one or more common categories comprise one of a category associated with a name component of the one or more name components or a parent category of a category associated with a name component of the one or more name components of a name component group.

11. The method of claim 1, wherein generating one or more name component groups from the name components of the one or more businesses comprises;
   determining that a first name component of the name component group is associated with a business with low prominence and discarding the name component from the name component group.

12. The method of claim 1, further comprising:
   receiving a listing of businesses, each business having a business location, name and one or more categories associated with the business;
   generating one or more geographic regions including the first geographic region, each geographic region comprising a portion of the entire area including the location of the businesses of the listing; and associating each business with one of the one or more geographic regions, when the business location is determined to be within the one of the one or more geographic regions.

13. The method of claim 1, further comprising:
identifying the location of the user; and
determining the geographic region based on the identified location of the user.

14. The method of claim 1, wherein the providing the one or more common categories to the user for inclusion within the query comprises:
identifying the location of the user;
determining a geographic region containing the location of the user;
determining a set of name components associated with businesses within the geographic region;
comparing the one or more search terms or phrases to the set of name components;
finding at least a first name component matching at least one of the one or more search terms or phrases; and
identifying one or more categories associated with the first name component to be provided to the user for inclusion within the query.

15. A system for associating categories with business names for generalizing search queries, the system comprising:
one or more processors; and
a machine-readable medium comprising instructions stored therein, which when executed by the processors, cause the processors to perform operations comprising:
receiving an indication of a search query from a user containing one or more search terms or phrases;
identifying a first geographic region associated with the user, the first geographic region being defined as a defined area including a set of locations;
identifying one or more businesses having a location of the set of locations;
determining a business name and one or more categories associated with each of the one or more businesses;
generating one or more name components based on the business name for each of the one or more businesses, the one or more name components comprising one or more of the business name, proper prefixes of the business name and proper post-fixes of the business name;
associating the one or more categories for each of the one or business with the one or more name components for the business;
for each name component of each of the one or more businesses:
determining if a name component group represented by the name component exists;
generating a name component group represented by the name component group if the name component group does not exist; and
adding the name component to the name component group represented by the name component; and
providing the one or more common categories to the user for inclusion within the query.

16. The system of claim 15, the operations further comprising:
for each generated name component group:
determining if the name component group includes only one name component;
generating a mapping of the name component and the one or more categories associated with the name component if the name component group includes only one name component.

17. The system of claim 15, the operations further comprising:
for each generated name component group:
determining if the name component group includes more than one name component;
identifying the one or more categories associated with each name component of the name component group;
comparing the one or more categories associated with each of the name components of the name component group to one another to determine if the name components include at least one common category; and
generating a mapping of the at least one common category and the name component represented by the name component group.

18. The system of claim 15, the operations further comprising:
wherein the one or more categories associated with each of the one or more businesses is a node in a hierarchical tree of increasingly generalized categories, and wherein each of the one or more common categories comprise one of a category associated with a name component of the one or more name components or a parent category of a category associated with a name component of the one or more name components of the name component group.

19. A non-transitory machine-readable medium comprising instructions stored therein, which when executed by a machine, cause the machine to perform operations comprising:
receiving an indication of a search query from a user containing one or more search terms or phrases;
identifying one or more businesses within a first geographic region associated with the user;
determining a business name and one or more categories associated with each of the one or more businesses;
generating one or more name components based on the business name for each of the one or more businesses, each name component of a business comprising one of the business name or a component of the business name;
associating the one or more categories for each of the one or businesses with the one or more name components for the business;
determining if a name component of a business of the one or more businesses is similar to at least another name component of another business of the one or more businesses;
mapping the one or more categories of the name component of the one or more name components that is not similar to at least another name component of the one or more name components with the one or more categories associated with the name component;
determining if the name component and one or more other components of the one or more name components that are similar to the name component share one or more common categories, if a name component of the one or more name components is similar to at least another name component of the one or more name components;
mapping the name component to the one or more common categories if the name component and one or more other components of the one or more name components that are similar to the name component share one or more common categories; and providing, using the one or more computing devices, the one or more common categories to the user for inclusion within the query.

20. The machine-readable medium of claim 19, the operations further comprising:

discarding the name component if the name component and one or more other components of the one or more name components that are similar to the name component do not share one or more common categories.

* * * * *